J. A. Braden,

Scissors and Shears,

No. 638, Reissued Dec. 28, 1858.

AM. PHOTO-LITHO. CO. N.Y. (OSBORNE'S PROCESS)

UNITED STATES PATENT OFFICE.

JOSEPH A. BRADEN, OF LA GRANGE, GEORGIA.

IMPROVEMENT IN SHEARS.

Specification forming part of Letters Patent No. 21,546, dated September 21, 1858; Reissue No. 638, dated December 28, 1858.

*To all whom it may concern:*

Be it known that I, JOSEPH A. BRADEN, of La Grange, in the county of Troup and State of Georgia, have invented a new and useful Improvement in Scissors and Shears; and I do hereby declare that the following is a full, clear, and exact description of the same, reference being had to the accompanying drawings, forming part of this specification, in which—

Figure 3:
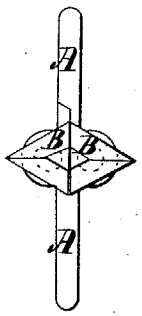
Figure 1:
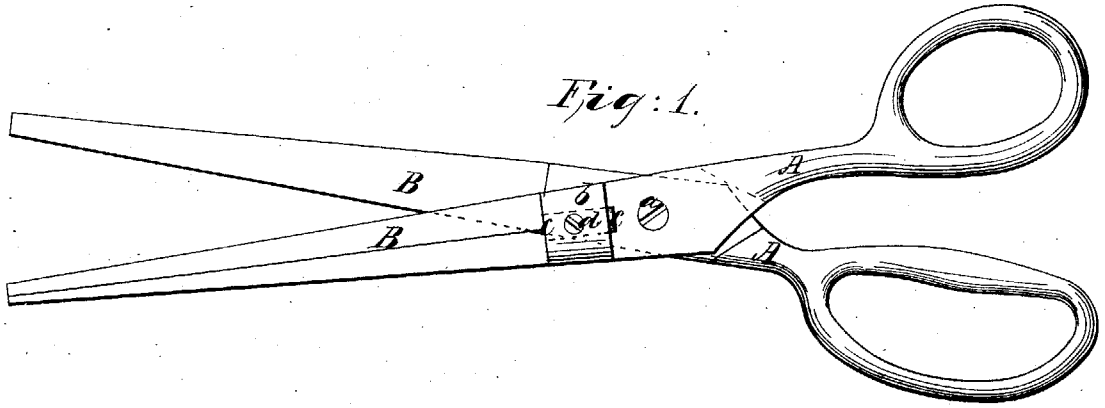
Figure 2:
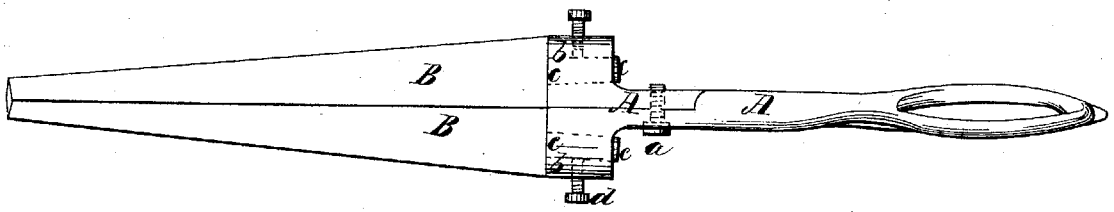

Figure 1 is a side view of a pair of shears constructed according to my invention. Fig. 2 is a top view of the same. Fig. 3 is a view looking directly toward the points of the same.

Similar letters of reference indicate corresponding parts in the several figures.

This invention consists in the construction of scissors and shears with their blades separate from the handles, and with stems on the blades fitted and secured into sockets in or upon the handles. The objects of this construction are, first, to permit the use of blades provided with two or more cutting-edges, and to provide for the shifting of such blades to present new cutting-edges when one pair of edges has been blunted; second, to allow the cutting-edges of the blades to be adjusted relatively to each other; and third, to allow different kinds of blades to be adapted to the same handles.

To enable others to make and use my invention, I will proceed to describe its construction and operation.

A A are the handles, made of the usual form and fitted together in the usual manner, and connected by the usual screw, rivet, or pin, *a*, beyond which they are extended but a short distance. The parts *b b* of the said handles, which are extended beyond the rivet screw, or pin *a*, are made in the form of sockets to receive the stems *c c*, which are formed on the blades B B to fit into the said sockets. The stems *c c* may be either of round or polygonal form, and the interiors of the sockets must be of corresponding form. Shoulders are formed on the blades in front of the stems *c c*, to fit the front faces of the sockets, and set-screws *d d* are fitted to the sockets to secure the stems in place. The blades represented are made of trihedral form, and with three pairs of cutting-edges, so that by slackening the set-screws and turning the stems of the said blades in the sockets of the handles, or taking them out and replacing them in a new position, a second pair of cutting-edges may be brought into an operative relation to each other when one pair is blunted, and a third pair after the second is blunted. Blades with a single pair of cutting-edges, or with two pairs, or with more than three may be used. The blades may have a shank, *c*, at each end, so that their ends may be reversed when their edges no longer cut well in one position, and thus be made to present them again in a comparatively good cutting condition.

What I claim as my invention, and desire to secure by Letters Patent, is—

The construction of scissors or shears with their blades in separate pieces from the handles and fitted to the handles with stems and sockets, substantially as and for the purposes herein set forth.

JOSEPH A. BRADEN.

Witnesses:
H. O. STANLEY,
G. A. BULL.